(No Model.)
P. MOUGEY.
RIDING HARROW.
No. 325,760. Patented Sept. 8, 1885.
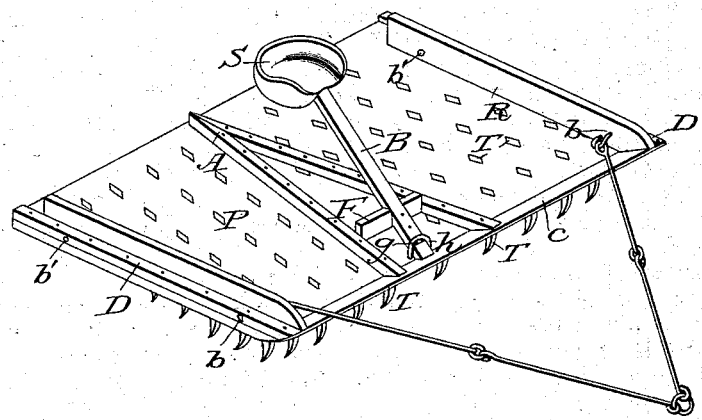
Witnesses:
Inventor:
Peter Mougey
By H. B. Swartz his Atty

United States Patent Office.

PETER MOUGEY, OF STERLING, OHIO.

RIDING-HARROW.

SPECIFICATION forming part of Letters Patent No. 325,760, dated September 8, 1885.

Application filed March 23, 1885. (No model.)

*To all whom it may concern:*

Be it known that I, PETER MOUGEY, a citizen of the United States, residing at Sterling, in the county of Wayne and State of Ohio, have invented a new and useful Riding-Harrow, of which the following is a specification.

My invention relates to riding-harrows, and especially to certain improvements in my riding-harrow for which Letters Patent of the United States No. 305,529 were issued to me September 23, A. D. 1884. The objects of my invention are, first, to strengthen and stiffen the platform of the harrow; and, second, to provide at the same time an improved device for securing the removable seat-standard upon the platform. I accomplish these objects by the devices illustrated in the accompanying drawing, in which the figure shows a diagonal view of a harrow embodying my invention.

P is a single closed platform which is provided with alternating rows of rearwardly-curved knife-teeth T, as heretofore used.

R R are inverted runners which are firmly attached to the ends of the platform, respectively, by means of bolts $b$ $b'$, which pass through the end cross-strips, D, to carry the harrow upside down, as heretofore.

Across the center of the platform is firmly attached a V-shaped frame, A, the feet of which are secured against the turned-up edge of the platform $c$. Between the limbs of this frame is fitted the removable cross-strip F, to which the seat-standard B is attached, and upon which it rests as a fulcrum. The lower end of the seat-standard is secured to the platform by the hook $g$ and staple $h$, as heretofore. By drawing forward the seat-standard the cross-strip F is lifted out of position and the hook $g$ is readily detached from the staple $h$, as heretofore.

The top of the V-shaped frame is lower than the end runners, R, so as not to catch on the ground when the harrow is inverted. The ends of this frame at the apex may be united or separated, as preferred.

By this simple device the harrow-platform is braced both ways and is much stronger and more durable than heretofore, and the seat-standard, while still detachable, rests more firmly and securely upon the platform than heretofore.

I am aware that the use of a V-shaped frame in harrows is not new, and I do not claim such broadly. My invention relates to the use of such frame as a substitute for the central runner as heretofore used by me in my riding-harrow patented as aforesaid, and in combination with a detachable seat-standard for the same, as aforesaid; and

What I claim is—

In a harrow constructed with a closed platform, P, provided with a series of rows of rearwardly-curved knife-teeth, the V-shaped frame attached to the platform, in combination with fulcrum-bar F, and the detachable seat-standard B, provided with hook $g$ and staple $h$, substantially as and for the purpose specified.

In testimony whereof I hereunto set my hand in presence of two witnesses.

PETER MOUGEY.

Witnesses:
N. R. STEINER,
B. F. HILL.